Dec. 16, 1941.  H. M. OLSON  2,266,692

LOCK FOR PISTON RING INSERTS

Filed Oct. 28, 1940

Inventor
Holly M. Olson
By Liverance and
Van Antwerp
Attorneys

Patented Dec. 16, 1941

2,266,692

UNITED STATES PATENT OFFICE 2,266,692

LOCK FOR PISTON RING INSERTS

Holly M. Olson, Muskegon, Mich., assignor to Sealed Power Corporation, Muskegon, Mich., a corporation of Michigan Application October 28, 1940, Serial No. 363,091

4 Claims. (Cl. 309—44)

This invention relates to piston rings, and is primarily concerned with a simple, novel and effective method for positively holding a metallic insert within a continuous groove cut at the outer curved sides of a piston ring between its upper and lower flat sides, said groove extending from one end of the ring at one side of its parting to the other end of the ring at the opposite side of the parting.

Piston rings of metal, generally cast iron, have been supplied with continuous band inserts of a different metal, for example, bronze or other suitable metal which have been forced in with a very secure drive fit of the band in the ring. Such method of securing the band causes it to be placed under a compression tending to buckling when the ring is spread at its parting to pass over a piston in installing it in a piston ring groove. And when the ring is contracted and closed at its parting, as it must be when in service in an engine, the band is under a tension at all times which must be resisted by the contact engagement of its side edges with the sides of the groove in which it is placed. With my invention it is an object and purpose that the metallic band insert shall be anchored in the groove at its ends while the ring is opened wider than normally at the parting. As thus anchored when the ring is freed from the force which further opens it at the parting, upon taking its normal free position the band will be placed under a tension which will be increased when the ring is contracted to close at its parting when used in an internal combustion engine.

An understanding of the invention may be had from the following description taken in connection with the accompanying drawing, in which, Fig. 1 is a perspective view of a piston ring made in accordance with my invention.

Like reference characters refer to like parts throughout the various views.

Figure 1:
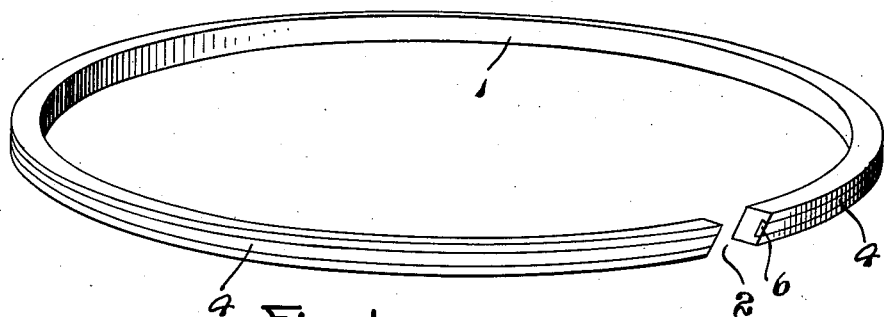
Figure 2:
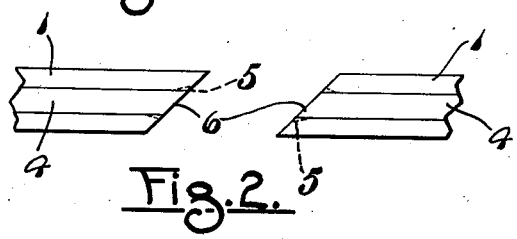
Fig. 2 is a fragmentary edge view of a piston ring at the parting therein indicating the metallic insert band at each end and adjacent each parting.
Figure 3:
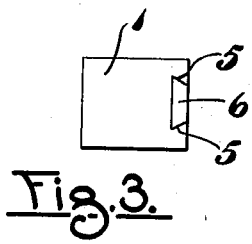
Fig. 3 is an end elevation of one end of the ring.
Figure 4:
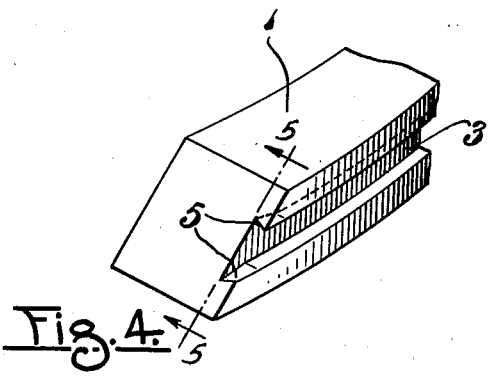
Fig. 4 is a fragmentary perspective view of one portion of the ring grooved for reception of the metallic band insert and with the end of the groove formed for insert anchoring purposes.
Figure 5:
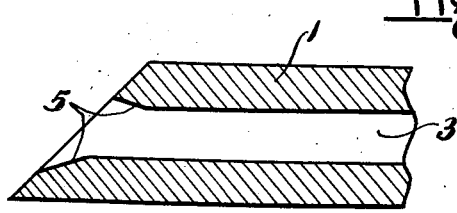
Fig. 5 is an enlarged fragmentary vertical section taken substantially on the plane of line 5—5 in Fig. 4.

The piston ring 1, preferably of cast iron, has a parting at one side at 2, whereby the ring may be opened to pass over a piston when it is to be installed in a piston ring groove. The ring is provided with a continuous groove 3 at its outer face extending from one end thereof to the other for receiving an insert band 4 of a different kind of metal. With this invention, the groove 3 at each end is preferably made of a dove-tail form as shown at 5 cut back at each end of the ring at the parting for a short distance, the remainder of the ring having sides perpendicular to the bottom of the groove. The dove-tailed portions 5 of the groove have their sides located at acute angles to the bottom of the groove as best shown in Fig. 4.

In applying the insert band to the ring, the ring is opened wider at the parting 2 than what the parting normally is, the band placed in the groove and at its ends swaged and upset so as to fill the widened dove-tailed portions 5 at the groove ends. The metal insert band is laid in the groove without any press or drive fit. With the band anchored at each end, when the ring is freed from the force which is holding it open wider at the parting it returns to its normal free position and the band is placed under tension. With the ends of the band anchored as described there is no danger of the band drawing away at each end or either end from the parting. This also is true when the parting is closed when placing the ring installed on a piston in an engine cylinder. On opening the ring wider at a parting for installation in a piston ring groove the tension on the band is relieved but it does not buckle and come out of the groove as opening such parting for installation on a piston will seldom be much, if any, greater than the opening that the parting had when the band was anchored at its ends to the ring. Even if the parting should be opened an extra amount, it would not materially affect the band should, in such case, one or both of the swaged ends of the band be moved inwardly slightly beyond the end of the parting. For on the ring returning to its normal position the widened ends of the band would return to their dove-tailed recesses and the band be placed under tension and held snugly and firmly within the groove 3 of the ring. With the anchoring of the ends of the insert as shown and described, or in an equivalent manner, such insert band is held securely in place against any tendency for movement when the ring is in service in an engine.

The anchoring of the ring in the insert band is practical and completely effective in service in an engine. Having thus fully described my invention, what I desire to claim and secure as Letters Patent is as follows:

1. A piston ring parted at one side having a continuous groove therein at its outer face and between its upper and lower flat sides, said groove having substantially parallel upper and lower sides except for a short distance at each side of the parting where it is of a dove-tail form wider at its bottom than at its outer side, and a metal band continuously filling the groove having its ends swaged to fill the dove-tailed end portions of the groove and thereby anchor said band at its ends against outward movement or movement away from the ends of the piston ring.

2. A piston ring parted at one side and having a continuous groove from one end of the ring to the other, said groove at each end thereof adjacent each end of the parting being laterally and inwardly enlarged for a short distance, and a continuous metal band inserted in and filling said groove and having its end portions swaged to completely fill the enlarged end portions of the groove and anchor said ends of the band to the ring.

3. A piston ring parted at one side and having a continuous groove in its outer curved face between its opposite flat sides, said groove adjacent each end thereof being laterally and inwardly enlarged for a short distance, and a metal band inserted in the groove having its outer face flush with the outer curved face of the ring, said band being swaged and upset at such enlarged portions of the groove to fill such portions and anchor the band on the ring.

4. A piston ring parted at one side having a continuous annular groove at its outer face, said groove having parallel upper and lower sides except for a short distance on either side of the parting, said sides along each of said short distances and at the back of the groove only diverging away from each other, and a metal band inserted in and filling said groove and having its end portions swaged to fill said short distances at each end of the groove thereby anchoring the ends of the band to said ring.

HOLLY M. OLSON.